(12) United States Patent
Hiura

(10) Patent No.: US 12,116,465 B2
(45) Date of Patent: Oct. 15, 2024

(54) WATER-SOLUBLE FILM AND CHEMICAL AGENT PACKAGE

(71) Applicant: MITSUBISHI CHEMICAL CORPORATION, Tokyo (JP)

(72) Inventor: Takahiro Hiura, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 17/752,218

(22) Filed: May 24, 2022

(65) Prior Publication Data

US 2022/0282049 A1 Sep. 8, 2022

Related U.S. Application Data

(63) Continuation of application No. 16/807,578, filed on Mar. 3, 2020, now Pat. No. 11,780,976, which is a continuation of application No. PCT/JP2018/038554, filed on Oct. 16, 2018.

(30) Foreign Application Priority Data

Oct. 18, 2017 (JP) ................................ 2017-201935

(51) Int. Cl.
C11D 17/04 (2006.01)
C08J 5/18 (2006.01)

(52) U.S. Cl.
CPC ............... *C08J 5/18* (2013.01); *C11D 17/043* (2013.01); *C08J 2329/04* (2013.01)

(58) Field of Classification Search
None
See application file for complete search history.

(56) References Cited

U.S. PATENT DOCUMENTS

| | | | |
|---|---|---|---|
| 4,747,976 A | 5/1988 | Yang et al. | |
| 4,885,105 A | 12/1989 | Yang et al. | |
| 2002/0182348 A1 | 12/2002 | Fujiwara et al. | |
| 2003/0130154 A1 | 7/2003 | Van Der Hoeven et al. | |
| 2004/0186034 A1 | 9/2004 | Verrall et al. | |
| 2006/0063691 A1 | 3/2006 | Carlomagno | |
| 2009/0291282 A1* | 11/2009 | Kitamura | C08K 5/0016 428/220 |
| 2012/0164424 A1 | 6/2012 | Vicari et al. | |
| 2016/0102278 A1* | 4/2016 | Labeque | C08J 5/18 510/513 |
| 2016/0280869 A1 | 9/2016 | Nii et al. | |
| 2017/0275394 A1 | 9/2017 | Mori et al. | |
| 2017/0298216 A1 | 10/2017 | Labeque et al. | |
| 2018/0251615 A1* | 9/2018 | Oda | C08L 29/04 |

FOREIGN PATENT DOCUMENTS

| | | |
|---|---|---|
| CN | 1771319 A | 5/2006 |
| CN | 106715493 A | 5/2017 |
| CN | 109072143 A | 12/2018 |
| EP | 0291198 A2 | 11/1988 |
| EP | 1418196 A1 * | 5/2004 |
| EP | 1 640 444 A1 | 3/2006 |
| EP | 3199560 A1 | 8/2017 |
| EP | 3443059 B1 | 5/2020 |
| JP | S64-014244 | 1/1989 |
| JP | 06-340899 A | 12/1994 |
| JP | 2001-219941 A | 8/2001 |
| JP | 2003-171424 A | 6/2003 |
| JP | 2003-335934 A | 11/2003 |
| JP | 2006-521449 | 9/2006 |
| JP | 2017-106008 A | 6/2017 |
| JP | 2017-115128 A | 6/2017 |
| WO | 2012-087821 | 6/2012 |
| WO | 2016-047126 | 9/2014 |
| WO | 2016-160116 | 10/2016 |

OTHER PUBLICATIONS

ISR issued in WIPO Patent Application No. PCT/JP2018/038554, Jan. 15, 2019, translation.
IPRP issued in WIPO Patent Application No. PCT/JP2018/038554, Apr. 21, 2020, translation.
EESR issued in EP Patent Application No. 18868674.5, Nov. 19, 2020.
Office Action issued in European Patent Application No. 18868674. 5, Aug. 4, 2021.
Office Action issued in CN Patent Application No. 201880052273.7, Dec. 3, 2021, English translation.
Office Action issued in JP Patent Application No. 2018-554600, Dec. 14, 2021, English translation.
Office Action issued in European Patent Application No. 18868674.5 dated Mar. 14, 2023.
Office Action issued in Chinese Patent Application No. 201880052278.7 dated Jan. 20, 2023, along with English translation thereof.
Office Action issued in the corresponding Chinese Patent Application No. 202210494313.1 dated Apr. 21, 2023, along with English translation.
Office Action issued in corresponding Chinese Patent Application No. 201880052273.7 dated Apr. 28, 2023, along with English translation.
Office Action issued in Chinese Patent Application No. 201880052273. 7, dated Jul. 28, 2022, along with English translation thereof.
Office Action issued in corresponding Japanese Patent Application No. 2022-112545 dated Apr. 4, 2023, along with English translation thereof.

(Continued)

*Primary Examiner* — Lorna M Douyon
(74) *Attorney, Agent, or Firm* — GREENBLUM & BERNSTEIN, P.L.C.

(57) ABSTRACT

To obtain a water-soluble film that is excellent in cold water solubility and is useful as a chemical agent package, provided is a water-soluble film, which is a polyvinyl alcohol water-soluble film including a maleic acid-modified polyvinyl alcohol resin (A) as a main component, wherein a lactonization rate of a maleic acid modifying group in the maleic acid-modified polyvinyl alcohol resin (A) is from 20% to 70%.

8 Claims, No Drawings

(56) References Cited

OTHER PUBLICATIONS

Office Action issued in the counterpart Chinese Patent Application No. 202210494313.1 dated Sep. 20, 2023, along with English translation thereof.
Office Action that issued in Chinese Patent Application No. 202210494313.1, mailed Nov. 29, 2023, along with English translation thereof.
Summons to attend oral proceedings pursuant to Rule 115(1) EPC issued in the European Patent Application No. 18868674.5, mailed Dec. 20, 2023.

\* cited by examiner

WATER-SOLUBLE FILM AND CHEMICAL AGENT PACKAGE

RELATED APPLICATION

This application is a continuation of U.S. application Ser. No. 16/807,578 filed Mar. 3, 2020, now U.S. patent Ser. No. 11/780,976, which is a continuation of International Application No. PCT/JP2018/038554, filed on Oct. 16, 2018, which claims priority to Japanese Patent Application No. 2017-201935, filed on Oct. 18, 2017, the entire contents of each of which being hereby incorporated by reference.

TECHNICAL FIELD

The present disclosure relates to a water-soluble film, including a carboxylic acid-modified polyvinyl alcohol resin as a main component, and more specifically, to a water-soluble film that is excellent in cold water solubility and also excellent in mechanical properties, and is useful as a chemical agent package, and a chemical agent package using the same.

BACKGROUND ART

A chemical agent portion package obtained by incorporating any one of various chemical agents, such as an agricultural chemical and a detergent, into a bag formed of a film of a polyvinyl alcohol resin through the exploitation of water solubility of the polyvinyl alcohol resin has heretofore been proposed, and has been used in a wide variety of applications.

A water-soluble film to be used in such chemical agent packaging applications is required to satisfy such mechanical properties as described below, in addition to having excellent water solubility. For example, when the film is turned into a package, the package is easily formed, and the package does not undergo bag breakage and does not cause a reduction in tension.

As a polyvinyl alcohol water-soluble film to be used for such chemical agent individual package, various films each using a modified polyvinyl alcohol resin are known. For example, in PTL 1, there is disclosed a film formed of an acrylic acid-modified polyvinyl alcohol resin that has a random monomer distribution and is excellent in cold water solubility. There is described that the film exhibits a short disintegration time and a short dissolution time in evaluation of water solubility at 21° C., and is excellent in water solubility. In addition, in PTL 2, as a water-soluble film suitable for cold water dissolution, there are disclosed various modified polyvinyl alcohol films each including a specific plasticizer. There is described that the amount of a film residue is small in evaluation of water solubility at 20° C.

RELATED ART DOCUMENT

Patent Document

PTL 1: WO 2012/087821 A1
PTL 2: WO 2016/160116 A1

SUMMARY

However, in recent years, a liquid detergent package has been increasingly used under various environments. In addition, in terms of environmental energy, such package is required to be dissolved easily in water at lower temperature.

Thus, a polyvinyl alcohol water-soluble film used for such package is required to be further improved in water solubility.

In particular, an acrylic acid-modified polyvinyl alcohol film has low water solubility at low temperature as compared to other carboxylic acid-modified polyvinyl alcohol films, and there sometimes arises a problem in that the film remains undissolved depending on use conditions. In addition, when the polyvinyl alcohol film is used for chemical agent packaging in neutral and weak alkaline regions, there arises another problem in that the water solubility of the film reduces over time.

In view of the foregoing, under such background, according to the present disclosure, there is provided a water-soluble film that exhibits excellent cold water solubility, which is also suppressed in reduction in water solubility over time when a chemical agent is packaged therein, which is also excellent in mechanical properties, and which is useful for chemical agent packaging applications.

To provide such water-soluble film, the inventor has made extensive investigations in view of such circumstances. As a result, the inventor has found that, in a water-soluble film including a carboxylic acid-modified polyvinyl alcohol resin as a main component, when the lactonization rate of a carboxylic acid modifying group in the carboxylic acid-modified polyvinyl alcohol resin in the film is set to fall within a specific range lower than in the related art, a polyvinyl alcohol water-soluble film that is excellent in cold water solubility and also excellent in mechanical properties is obtained.

Specifically, the inventor has focused attention on the structure of the carboxylic acid modifying group in the polyvinyl alcohol resin in the film, and adjusted a balance between a lactone ring structure and a carboxylic acid or a salt thereof, that is, set the lactonization rate of the carboxylic acid modifying group to fall within a specific range lower than in the related art. As a result, the water solubility of the film at low temperature can be improved without impairing the mechanical properties of the film, and thus a water-soluble film excellent in cold water solubility can be obtained.

That is, according to a first aspect of the present disclosure, there is provided a water-soluble film, which is a polyvinyl alcohol water-soluble film including a carboxylic acid-modified polyvinyl alcohol resin (A) as a main component, wherein a lactonization rate of a carboxylic acid modifying group in the carboxylic acid-modified polyvinyl alcohol resin (A) is from 20% to 70%.

In addition, according to a second aspect of the present disclosure, there is provided a water-soluble film having a dissolution time of 250 seconds or less in a water solubility test in water at 10° C. after immersed in a liquid detergent having a pH of 8.

Further, according to a third aspect of the present disclosure, there is provided a chemical agent package, including: a package bag obtained by bonding the water-soluble films to each other; and a chemical agent packaged in the package bag.

The water-soluble film of the present disclosure is excellent in cold water solubility and also excellent in mechanical properties.

In particular, even when the water-soluble film includes an acrylic acid-modified polyvinyl alcohol resin, the water-soluble film is excellent in cold water solubility, and further, can be effectively suppressed in reduction in water solubility over time when a chemical agent is packaged therein.

In addition, when the carboxylic acid modification amount of the carboxylic acid-modified polyvinyl alcohol resin (A) is from 1 mol % to 20 mol %, additionally excellent cold water solubility can be obtained.

In addition, when the polyvinyl alcohol water-soluble film further includes a plasticizer (B), and the content of the plasticizer (B) is from 20 parts by weight to 70 parts by weight with respect to 100 parts by weight of the carboxylic acid-modified polyvinyl alcohol resin (A), in the case where a package is provided by packaging a liquid, such as a liquid chemical agent, with the water-soluble film, a reduction in toughness of the water-soluble film over time can be suppressed, and further, a reduction in mechanical strength of the water-soluble film can also be suppressed.

When the carboxylic acid-modified polyvinyl alcohol resin (A) includes an acrylic acid-modified polyvinyl alcohol resin, a significantly improved effect on cold water solubility over time can be obtained.

Further, when the water-soluble film is used as a chemical agent package, a chemical agent can be used without opening the package.

When, after the water-soluble film is immersed in a liquid detergent having a pH of 8, the water-soluble film has a dissolution time of 250 seconds or less in a water solubility test in water at 10° C., an improving effect on cold water solubility that cannot be achieved by the related art can be obtained.

In addition, the chemical agent package, including: a package bag obtained by bonding the above-mentioned water-soluble films; and a chemical agent packaged in the package bag, can be simply used without any need for its opening. Further, the chemical agent package can provide a satisfactory package because the above-mentioned water-soluble film is excellent in cold water solubility and also excellent in mechanical properties.

In the case of the chemical agent package in which the chemical agent includes a detergent, labor for metering at the time of the use of the detergent can be eliminated, and hence the chemical agent package can be more simply used.

In the case of the chemical agent package in which the chemical agent includes a liquid detergent, the chemical agent package can be even more simply used without the contamination of its surroundings with the liquid detergent.

When the liquid detergent has a pH of from 6 to 14, an excellent washing effect on a dirt component, such as grease or a protein, is obtained, and a reduction in water solubility of the water-soluble film over time is suppressed.

DESCRIPTION OF EMBODIMENTS

The present disclosure is specifically described below.

A polyvinyl alcohol water-soluble film of the present disclosure includes a carboxylic acid-modified polyvinyl alcohol resin (A) as a main component, wherein the lactonization rate of a carboxylic acid modifying group included in the carboxylic acid-modified polyvinyl alcohol resin (A) in the film falls within a specific range.

The "polyvinyl alcohol" is hereinafter sometimes abbreviated as "PVA", and the "water-soluble film including a polyvinyl alcohol resin as a main component" is hereinafter sometimes abbreviated as "PVA water-soluble film."

The phrase "includes a carboxylic acid-modified PVA resin (A) as a main component" as used herein means that the content of the carboxylic acid-modified PVA resin (A) is generally 50 wt. % or more, preferably 55 wt. % or more, particularly preferably 60 wt. % or more with respect to the total amount of the water-soluble film.

When such content is excessively small, the water solubility and mechanical properties of the film tend to reduce. The upper limit of the content is generally 99 wt. % or less, preferably 95 wt. % or less, particularly preferably 90 wt. % or less in terms of the shape stability of the film over time when the film is turned into a chemical agent package.

In the present disclosure, it is important that the lactonization rate of the carboxylic acid modifying group included in the carboxylic acid-modified PVA resin (A) in the film be from 20% to 70%, and the lactonization rate is preferably from 30% to 65%.

When such lactonization rate is excessively low, the film becomes so soft that its formability reduces, or the film is dissolved in water so fast that the effects of the present disclosure cannot be achieved. Also when such lactonization rate is excessively high, the cold water solubility of the film reduces, or the water solubility of the film reduces over time when a chemical agent is packaged therein, and hence the effects of the present disclosure cannot be achieved.

The carboxylic acid modifying group included in the carboxylic acid-modified PVA resin (A) generally exists as a carboxylic acid or a salt thereof, and part thereof forms a lactone ring structure through a reaction between a hydroxy group derived from a vinyl ester and a carboxyl group.

Moreover, with regard to the control of the lactonization rate, there are given, for example: (1) a method involving, at the time of preparation of a film-forming raw material for the water-soluble film, adjusting the pH of the film-forming raw material to fall within an appropriate weak alkaline range; and (2) a method involving, at the time of preparation of a film-forming raw material for the water-soluble film, preparing the film-forming raw material in the coexistence of an acid catalyst and water. Of those, the method (1) is preferred because the lactonization rate is controlled easily. When the film-forming raw material is prepared by any one of the above-mentioned methods, the lactonization rate of the carboxylic acid modifying group included in the carboxylic acid-modified PVA resin (A) in the film can be set to fall within the specific range specified in the present disclosure.

Examples of the lactone ring include lactone rings each having 3 to 10 carbon atoms, such as α-acetolactone (C=2), β-propiolactone (C=3), γ-butyrolactone (C=4), and δ-valerolactone (C=5).

Of those, γ-butyrolactone having 4 carbon atoms is preferred in terms of ease of lactonization control.

In the present disclosure, the lactonization rate of the carboxylic acid modifying group included in the carboxylic acid-modified PVA resin (A) is measured by a method described below.

Specifically, the PVA water-soluble film is dissolved in a solvent ($D_2O$) so that a sample concentration of 5 w/v % is obtained, and subjected to $^1$H-NMR measurement (use device: "Ascend 400" (400 MHz) manufactured by Bruker, internal standard substance: sodium 3-trimethylsilylpropionate, solvent: $D_2O$, measurement temperature: 50° C., number of scans: 16). The contents of structures (a carboxylic acid, a carboxylic acid salt, and a lactone ring) are each calculated based on an integral value of a peak in a $^1$H-NMR spectrum, and the content ratio of the lactone ring is determined.

For example, in the case of a maleic acid-modified PVA resin, the content of the carboxylic acid or the carboxylic acid salt can be calculated based on an integral value (I) of a peak detected at 2.35 ppm to 2.9 ppm, and the content of the lactone ring structure can be calculated based on an integral value (II) of a peak detected at 2.9 ppm to 3.35 ppm.

In this case, the lactonization rate of the carboxylic acid modifying group is calculated by the following equation.

$$\text{Lactonization rate (\%)} = (II)/\{(I)+(II)\} \times 100 \quad [\text{Eq.}]$$

In addition, for example, in the case of an acrylic acid-modified PVA resin, the content of the carboxylic acid or the carboxylic acid salt can be calculated based on an integral value (III) of a peak detected at 2.35 ppm to 2.6 ppm, and the content of the lactone ring structure can be calculated based on an integral value (IV) of a peak detected at 2.6 ppm to 3.1 ppm.

In this case, the lactonization rate of the carboxylic acid modifying group is calculated by the following equation.

$$\text{Lactonization rate (\%)} = (IV)/\{(III)+(IV)\} \times 100 \quad [\text{Eq.}]$$

<Carboxylic Acid-Modified PVA Resin (A)>

First, the carboxylic acid-modified PVA resin (A) to be used in the present disclosure is described.

Examples of the carboxylic acid-modified PVA resin (A) to be used in the present disclosure include an acrylic acid-modified PVA resin, an itaconic acid-modified PVA resin, and a maleic acid-modified PVA resin. Those resins may be used alone or in combination thereof.

Of those, in the present disclosure, a maleic acid-modified PVA resin and an itaconic acid-modified PVA resin are preferred because each of the resins has high handleability and is highly polymerizable with a vinyl ester monomer, and is excellent in productivity. In addition, an acrylic acid-modified PVA resin is preferred because an improving effect on cold water solubility of the present disclosure is easily obtained.

In the PVA water-soluble film of the present disclosure, particularly when the carboxylic acid-modified PVA resin (A) serving as a main component is an acrylic acid-modified PVA resin, a remarkable improving effect on cold water solubility over time is exhibited.

The carboxylic acid-modified PVA resin (A) to be used in the present disclosure may be produced by an arbitrary method, and examples thereof may include: (i) a method involving copolymerizing a vinyl ester compound and an unsaturated monomer having a carboxyl group, and then saponifying the resultant copolymer; and (ii) a method involving polymerizing the vinyl ester compound while causing an alcohol having a carboxyl group or a compound having a carboxyl group and a functional group, such as an aldehyde or a thiol, to coexist as a chain transfer agent, and then saponifying the resultant polymer.

Examples of the vinyl ester compound in the method of the above-mentioned item (i) or (ii) include vinyl formate, vinyl acetate, vinyl trifluoroacetate, vinyl propionate, vinyl butyrate, vinyl caprate, vinyl laurate, vinyl versatate, vinyl palmitate, and vinyl stearate. Of those, vinyl acetate is preferably used. The vinyl ester compounds may be used alone or in combination thereof.

Examples of the unsaturated monomer having a carboxyl group in the method (i) include monomers, such as ethylenically unsaturated dicarboxylic acids (e.g., maleic acid, fumaric acid, and itaconic acid), ethylenically unsaturated dicarboxylic acid monoesters (e.g., a maleic acid monoalkyl ester, a fumaric acid monoalkyl ester, and an itaconic acid monoalkyl ester), ethylenically unsaturated dicarboxylic acid diesters (e.g., a maleic acid dialkyl ester, a fumaric acid dialkyl ester, and an itaconic acid dialkyl ester), provided that those diesters are each required to be transformed into a carboxyl group by hydrolysis at the time of saponification of the copolymer, ethylenically unsaturated carboxylic acid anhydrides (e.g., maleic anhydride and itaconic anhydride), and ethylenically unsaturated monocarboxylic acids (e.g., (meth)acrylic acid and crotonic acid), and salts thereof.

Of those, maleic acid, a maleic acid monoalkyl ester, a maleic acid dialkyl ester, a maleic acid salt, maleic anhydride, itaconic acid, an itaconic acid monoalkyl ester, an itaconic acid dialkyl ester, (meth)acrylic acid, and the like are preferably used, maleic acid, a maleic acid monoalkyl ester, a maleic acid dialkyl ester, a maleic acid salt, maleic anhydride, and (meth)acrylic acid are particularly preferably used. Those unsaturated monomers each having a carboxyl group may be used alone or in combination thereof.

In the present disclosure, the "(meth)acrylic" means acrylic or methacrylic.

In the method (ii), a compound derived from a thiol, the compound having a particularly large chain transfer effect, is effective, and examples thereof include the following compounds and salts thereof.

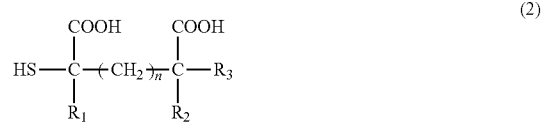

In the general formulae (1) and (2), "n" represents an integer of from 0 to 5, and $R_1$, $R_2$, and $R_3$ each represent a hydrogen atom or a lower alkyl group (that may contain a substituent).

In the general formula (3), "n" represents an integer of from 0 to 20.

Specific examples thereof include mercaptoacetic acid, 2-mercaptopropionic acid, 3-mercaptopropionic acid, and 2-mercaptostearic acid.

The polymerization may be performed by incorporating any other general monomer in addition to the unsaturated monomer having a carboxyl group and the vinyl ester compound to the extent that the water solubility of the resin to be obtained is not impaired, and for example, an allyl ester of a saturated carboxylic acid, an α-olefin, an alkyl vinyl ether, an alkyl allyl ether, (meth)acrylamide, (meth)acrylonitrile, styrene, or vinyl chloride may be used as such monomer.

A known polymerization method, such as a solution polymerization method, an emulsion polymerization method, or a suspension polymerization method, may be arbitrarily used as a copolymerization method for the vinyl ester compound and the unsaturated monomer having a carboxyl group in the item (i). However, the copolymerization is generally performed by a solution polymerization method involving using an alcohol, such as methanol, ethanol, or isopropyl alcohol, as a solvent.

As a polymerization catalyst, known polymerization catalysts, such as azo catalysts including azobisisobutyronitrile, and peroxide catalysts including acetyl peroxide, benzoyl peroxide, and lauroyl peroxide, may each be appropriately selected in accordance with the polymerization method. In addition, the reaction temperature of the polymerization is selected from the range of from 50° C. to about a boiling point.

The saponification may be performed by a known method, and is generally performed by dissolving the resultant copolymer in an alcohol in the presence of a saponification catalyst. Examples of the alcohol include methanol, ethanol, and butanol. The concentration of the copolymer in the alcohol is selected from the range of from 20 wt. % to 50 wt. % from the viewpoint of a dissolution rate.

For example, alkali catalysts, such as hydroxides and alcoholates of alkali metals including sodium hydroxide, potassium hydroxide, sodium methylate, sodium ethylate, and potassium methylate, may each be used as the saponification catalyst, and an acid catalyst may also be used. The usage amount of the saponification catalyst is preferably set to from 1 millimole equivalent to 100 millimole equivalents with respect to the vinyl ester compound.

In addition, the production method for the carboxylic acid-modified PVA resin (A) is not limited to the above-mentioned methods. For example, a method involving causing a carboxyl group-containing compound having a functional group having reactivity with a hydroxy group, such as a dicarboxylic acid, an aldehyde carboxylic acid, or a hydroxy carboxylic acid, to post-react with a polyvinyl alcohol (a partially saponified product or a completely saponified product) may also be performed.

The average saponification degree of the carboxylic acid-modified PVA resin (A) to be used in the present disclosure is preferably 80 mol % or more, particularly preferably from 82 mol % to 99.9 mol %, more preferably from 85 mol % to 99.5 mol %, still more preferably from 90 mol % to 99.0 mol %. When such average saponification degree is excessively small, the water solubility of the film tends to reduce.

In addition, the 4 wt. % aqueous solution viscosity of the carboxylic acid-modified PVA resin (A) to be used in the present disclosure at 20° C. is preferably from 10 mPa·s to 50 mPa·s, particularly preferably from 15 mPa·s to 45 mPa·s, more preferably from 20 mPa·s to 40 mPa·s. When such viscosity is excessively small, the mechanical strength of the film serving as a packaging material tends to reduce. When the viscosity is excessively large, the aqueous solution viscosity of the resin at the time of film formation is high, and hence the productivity of the film tends to reduce.

The average saponification degree is measured in conformity with JIS K 6726 3.5, and the 4 wt. % aqueous solution viscosity is measured in conformity with JIS K 6726 3.11.2.

In the present disclosure, the modification amount of the carboxylic acid-modified PVA resin (A) is preferably from 1 mol % to 20 mol %, particularly preferably from 1.5 mol % to 15 mol %, more preferably from 2 mol % to 12 mol %. When such modification amount is excessively small, the water solubility, particularly the cold water solubility of the film tends to reduce, or the water solubility of the film tends to reduce over time when a chemical agent is packaged therein. When such modification amount is excessively large, the productivity of the resin tends to reduce, or the biodegradability thereof tends to reduce. In addition, the blocking of the film is liable to occur.

In particular, when the carboxylic acid-modified PVA resin (A) is a maleic acid-modified PVA resin, the modification amount is preferably from 1 mol % to 10 mol %, particularly preferably from 1.5 mol % to 9 mol %, more preferably from 2 mol % to 8 mol %, and when the carboxylic acid-modified PVA resin (A) is an acrylic acid-modified PVA resin, the modification amount is preferably from 2 mol % to 15 mol %, particularly preferably from 3 mol % to 12 mol %, more preferably from 4 mol % to 10 mol %.

In the PVA water-soluble film of the present disclosure, for example, the carboxylic acid-modified PVA resin (A) may be used alone or two or more kinds thereof different from each other in saponification degree, viscosity, modification amount, modifying group, or the like may be used in combination.

In addition, the PVA water-soluble film of the present disclosure may include any other modified PVA resin than the carboxylic acid-modified PVA resin (A) or unmodified PVA to the extent that the effects of the present disclosure are not impaired. Examples of the other modified PVA resin than the carboxylic acid-modified PVA resin (A) include a sulfonic acid group-modified PVA resin, a phosphoric acid group-modified PVA resin, and a PVA resin having a 1,2-diol structural unit in a side chain thereof.

The content of the other modified PVA resin than the carboxylic acid-modified PVA resin (A) or the unmodified PVA is preferably 50 wt. % or less, particularly preferably 30 wt. % or less, more preferably 10 wt. % or less with respect to the total amount of the PVA resin in the film.

[Plasticizer (B)]

It is preferred that the PVA water-soluble film of the present disclosure further include a plasticizer (B) in terms of the impartment of flexibility and easy formability to the film. Although the plasticizers (B) may be used alone or in combination thereof, two or more kinds thereof are preferably used in combination in terms of the toughness of the film itself when the film is used as a package, and in particular, in terms of the shape stability of a package over time when a liquid detergent is packaged in the package.

When two or more kinds of such plasticizers (B) are used in combination, it is preferred to use the following two kinds of plasticizers: a polyhydric alcohol (B1) having a melting point of 80° C. or more (hereinafter sometimes abbreviated as "plasticizer (B1)"); and a polyhydric alcohol (B2) having a melting point of 50° C. or less (hereinafter sometimes abbreviated as "plasticizer (B2)") in terms of: the toughness of the film at the time of production of the water-soluble film or at the time of production of a package; and the shape stability of a package over time when the film is turned into a package for a liquid chemical agent.

As the polyhydric alcohol (B1), that is, the plasticizer (B1), having a melting point of 80° C. or more, many kinds of sugar alcohols, monosaccharides, and polysaccharides may be applied. Of those, examples thereof include: dihydric alcohols, such as salicyl alcohol (83° C.), catechol (105° C.), resorcinol (110° C.), hydroquinone (172° C.), bisphenol A (158° C.), bisphenol F (162° C.), and neopentyl glycol (127° C.); trihydric alcohols, such as phloroglucinol (218° C.); tetrahydric alcohols, such as erythritol (121° C.), threitol (88° C.), and pentaerythritol (260° C.); pentahydric alcohols, such as xylitol (92° C.), arabitol (103° C.), fucitol (153° C.), glucose (146° C.), and fructose (104° C.); hexahydric alcohols, such as mannitol (166° C.), sorbitol (95° C.), and inositol (225° C.); octahydric alcohols, such as lactitol (146° C.), sucrose (186° C.), and trehalose (97° C.); and nonahydric or higher alcohols, such as maltitol (145° C.). Those alcohols may be used alone or in combination thereof. The melting point of each compound is shown in the parentheses.

Of those, a polyhydric alcohol having a melting point of 85° C. or more is preferred in terms of the tensile strength of the water-soluble film, and a polyhydric alcohol having a melting point of 90° C. or more is particularly preferred. The upper limit of the melting point is generally preferably 300° C., particularly preferably 200° C.

Further, in the present disclosure, the number of hydroxy groups in a molecule of the plasticizer (B1) is preferably 4 or more in terms of compatibility with the PVA resin, and is particularly preferably from 5 to 10, more preferably from 6 to 8. Suitable specific examples of the plasticizer satisfying such condition include sorbitol, sucrose, and trehalose.

In addition, in the present disclosure, the molecular weight of the plasticizer (B1) is preferably 150 or more in terms of the tension of the water-soluble film, and is particularly preferably from 160 to 500, more preferably from 180 to 400. Suitable specific examples of the plasticizer satisfying such condition include sorbitol and sucrose.

Meanwhile, as the polyhydric alcohol (B2), that is, the plasticizer (B2), having a melting point of 50° C. or less, many kinds of aliphatic alcohols may be applied. Preferred examples thereof include: dihydric alcohols, such as ethylene glycol (−13° C.), diethylene glycol (−11° C.), triethylene glycol (−7° C.), propylene glycol (−59° C.), tetraethylene glycol (−5.6° C.), 1,3-propanediol (−27° C.), 1,4-butanediol (20° C.), 1,6-hexanediol (40° C.), tripropylene glycol, and polyethylene glycol having a molecular weight of 2,000 or less; and trihydric or higher alcohols, such as glycerin (18° C.), diglycerin, and triethanolamine (21° C.). Of those, a polyhydric alcohol having a melting point of 30° C. or less is preferred in terms of the flexibility of the water-soluble film, and a polyhydric alcohol having a melting point of 20° C. or less is particularly preferred. The lower limit of the melting point is typically −80° C., preferably −10° C., particularly preferably 0° C. Those alcohols may be used alone or in combination thereof. The melting point of each compound is shown in the parentheses.

Further, in the present disclosure, the number of hydroxy groups in a molecule of the plasticizer (B2) is preferably 4 or less, particularly preferably 3 or less because the control of the flexibility near room temperature (25° C.) is facilitated. Specifically, for example, glycerin is suitable as the plasticizer satisfying such condition.

In addition, in the present disclosure, the molecular weight of the plasticizer (B2) is preferably 100 or less because the control of the flexibility is facilitated, and is particularly preferably from 50 to 100, more preferably from 60 to 95. Specifically, for example, glycerin is suitable as the plasticizer satisfying such condition.

In the present disclosure, a plasticizer (B3) except the plasticizers (B1) and (B2) may be used in combination. Examples of such plasticizer (B3) include: alcohols, such as trimethylolpropane (58° C.), diethylene glycol monomethyl ether, cyclohexanol, carbitol, and polypropylene glycol; ethers, such as dibutyl ether; carboxylic acids, such as stearic acid, oleic acid, linoleic acid, linolenic acid, sorbic acid, citric acid, and adipic acid; ketones, such as cyclohexanone; amines, such as monoethanolamine, triethanolamine, ethylenediamine, and an imidazole compound; and amino acids, such as alanine, glycine, aspartic acid, glutamic acid, histidine, lysine, and cysteine. In addition, in terms of excellent curling resistance and satisfactory balance between strength and flexibility, it is preferred to use the following three kinds of plasticizers: the plasticizer (B1) and the plasticizer (B2), and in addition, a polyhydric alcohol having a melting point of more than 50° C. and less than 80° C. serving as the plasticizer (B3). It is particularly preferred to use trimethylolpropane as the plasticizer (B3).

The content of the plasticizer (B) is preferably 20 parts by weight or more, more preferably from 20 parts by weight to 70 parts by weight, particularly preferably from 25 parts by weight to 65 parts by weight, more preferably from 30 parts by weight to 60 parts by weight, still more preferably from 35 parts by weight to 50 parts by weight with respect to 100 parts by weight of the carboxylic acid-modified PVA resin (A). When such content of the plasticizer (B) is excessively small, in the case where a package is provided by packaging a liquid, such as a liquid chemical agent, with the water-soluble film, the toughness of the water-soluble film tends to be impaired over time. When the content is excessively large, the mechanical strength of the film tends to reduce.

In addition, when the plasticizer (B1) and the plasticizer (B2) are used in combination as the plasticizer (B), the content ratio (weight ratio) (B1/B2) thereof is preferably from 0.1 to 5, particularly preferably from 0.35 to 4.5, more preferably from 0.4 to 4, still more preferably from 0.5 to 3.5, most preferably from 0.7 to 3. When such content weight ratio is excessively small, the water-soluble film tends to be softened excessively, sealing strength at low temperature tends to reduce, and the blocking of the film is liable to occur. When such content weight ratio is excessively large, the water-soluble film tends to be so hard as to be brittle under a low-humidity environment.

In addition, with regard to the contents of the plasticizer (B1) and the plasticizer (B2), the content of the plasticizer (B1) is preferably from 5 parts by weight to 40 parts by weight, more preferably from 8 parts by weight to 30 parts by weight, particularly preferably from 10 parts by weight to 25 parts by weight, and the content of the plasticizer (B2) is preferably from 5 parts by weight to 40 parts by weight, particularly preferably from 10 parts by weight to 35 parts by weight, more preferably from 15 parts by weight to 30 parts by weight, with respect to 100 parts by weight of the carboxylic acid-modified PVA resin (A).

When such content of the plasticizer (B1) is excessively small, the water-soluble film tends to be so soft that its blocking is liable to occur. When such content of the plasticizer (B1) is excessively large, the water-soluble film tends to be so hard as to be brittle under a low-humidity environment. In addition, when such content of the plasticizer (B2) is excessively small, the water-soluble film tends to be so hard as to be brittle under a low-humidity environment. When such content of the plasticizer (B2) is excessively large, the water-soluble film tends to be so soft that its blocking is liable to occur.

Further, the total amount of the plasticizer (B1) and the plasticizer (B2) is preferably 70 wt. % or more, particularly preferably 80 wt. % or more, more preferably 85 wt. % or more with respect to the total amount of the plasticizer (B). When such total amount of the plasticizer (B1) and the plasticizer (B2) is excessively small, the mechanical strength of the film tends to reduce.

In addition, with regard to the ratio among the plasticizer (B1), the plasticizer (B2), and the plasticizer (B3) in the case where the plasticizer (B3) is used in combination with the plasticizer (B1) and the plasticizer (B2), the content ratio of the plasticizer (B3) with respect to the total amount of the plasticizer (B1), the plasticizer (B2), and the plasticizer (B3) is preferably 20 wt. % or less, and in particular, in terms of ease of forming, pinhole resistance, and bag breakage resistance, is preferably from 0.5 wt. % to 18 wt. %, particularly preferably from 2 wt. % to 15 wt. %, more preferably from 4 wt. % to 13 wt. %. When the content ratio of the plasticizer (B3) is excessively large, the state of the film largely changes between normal temperature and high temperature, and there are risks in that the pinhole resistance and the bag breakage resistance may reduce.

Further, the content ratio (weight ratio) (B3/B1) of the plasticizer (B3) to the plasticizer (B1) is preferably from 0.02 to 10, particularly preferably from 0.05 to 8, more preferably from 0.1 to 5. When such content ratio is excessively small, the formability tends to reduce. When such content ratio is excessively large, the pinhole resistance and the bag breakage resistance tend to reduce.

The content ratio (weight ratio) (B3/B2) of the plasticizer (B3) to the plasticizer (B2) is preferably from 0.02 to 10, particularly preferably from 0.05 to 8, more preferably from 0.1 to 5. When such content ratio is excessively small, the water-soluble film is softened and bag breakage may occur. When such content ratio is excessively large, the pinhole resistance and the bag breakage resistance tend to reduce.

In the present disclosure, a filler (C), a surfactant (D), or the like may be further incorporated as required.

The filler (C) is incorporated for the purpose of the blocking resistance of the film. Examples thereof include an organic filler (C1) and an inorganic filler (C2). Of those, an organic filler (C1) is suitably used. In addition, in terms of improvement in water sealability at the time of production of a package, combination use of the organic filler (C1) and the inorganic filler (C2) is preferred.

The organic filler (C1) to be used in the present disclosure refers to a particulate substance (primary particles) that is formed of an organic compound and has an arbitrary shape, such as a needle shape, a rod shape, a layer shape, a flake shape, or a spherical shape, or to an aggregate of the particulate substance (secondary particles).

Such organic filler (C1) is selected mainly from polymer compounds, and examples thereof include a melamine resin, a polymethyl (meth)acrylate resin, a polystyrene resin, and biodegradable resins, such as starch and a polylactic acid. Of those, a polymethyl (meth)acrylate resin, a polystyrene resin, and a biodegradable resin, such as starch, are preferred, and in terms of dispersibility in PVA, starch is particularly preferred.

Examples of the starch include raw starches (e.g., corn starch, potato starch, sweet potato starch, wheat starch, cassava starch, sago starch, tapioca starch, sorghum starch, rice starch, legume starch, pueraria starch, bracken starch, lotus starch, and water chestnut starch), physically modified starches (e.g., α-starch, fractionated amylose, and heat-moisture-treated starch), enzymatically modified starches (e.g., hydrolyzed dextrin, enzyme-decomposed dextrin, and amylose), chemically degraded starches (e.g., acid-treated starch, hypochlorous acid-oxidized starch, and dialdehyde starch), and chemically modified starch derivatives (e.g., esterified starch, etherified starch, cationized starch, and cross-linked starch). Of those, raw starches, in particular, corn starch and rice starch are preferably used in terms of ease of availability and economic efficiency.

The inorganic filler (C2) to be used in the present disclosure refers to a particulate substance (primary particles) that is formed of an inorganic compound and has an arbitrary shape, such as a needle shape, a rod shape, a layer shape, a flake shape, or a spherical shape, or to an aggregate of the particulate substance (secondary particles).

Examples of the inorganic filler (C2) include inorganic oxide compounds, such as silica (silicon dioxide), diatomaceous earth, titanium oxide, calcium oxide, magnesium oxide, aluminum oxide, barium oxide, germanium oxide, tin oxide, and zinc oxide, talc, clay, kaolin, mica, asbestos, gypsum, graphite, glass balloons, glass beads, calcium sulfate, barium sulfate, ammonium sulfate, calcium sulfite, calcium carbonate, calcium carbonate whisker, magnesium carbonate, dawsonite, dolomite, potassium titanate, carbon black, glass fibers, alumina fibers, boron fibers, processed mineral fibers, carbon fibers, hollow carbon spheres, bentonite, montmorillonite, copper powder, sodium sulfate, potassium sulfate, zinc sulfate, copper sulfate, iron sulfate, magnesium sulfate, aluminum sulfate, aluminum potassium sulfate, ammonium nitrate, sodium nitrate, potassium nitrate, aluminum nitrate, ammonium chloride, sodium chloride, potassium chloride, magnesium chloride, calcium chloride, sodium phosphate, and potassium chromate. Those inorganic fillers may be used alone or in combination thereof.

Of those, an inorganic oxide compound or talc is preferably used because such filler is excellent in hydrogen bonding action to the PVA resin and exhibits a high improving effect on the water sealability. Titanium oxide, talc, or silica is particularly preferably used, and silica is more preferably used.

The average particle diameter of the filler (C) is preferably from 1 μm to 50 μm, particularly preferably from 3 μm to 35 μm in terms of the blocking resistance of the film.

In addition, the average particle diameter of the organic filler (C1) is preferably from 5 μm to 50 μm, particularly preferably from 10 μm to 40 μm, more preferably from 15 μm to 35 μm. When such average particle diameter is excessively small, the film tends to have higher blocking tendency. When such average particle diameter is excessively large, the fillers are liable to be aggregated to each other and dispersibility tends to reduce, or at the time of the stretching of the film in its forming processing, a pinhole tends to occur.

The average particle diameter of the organic filler (C1) is a value measured by a laser diffraction particle size distribution measurement device, and is calculated from a D50 value (cumulative 50% particle diameter) in the resultant volume-based cumulative distribution.

In addition, the average particle diameter of the inorganic filler (C2) is preferably from 1 μm to 20 μm, particularly preferably from 2 μm to 15 μm, more preferably from μm to 10 μm. When such average particle diameter is excessively small, the film tends to have higher blocking tendency, or the flexibility and toughness of the film tend to reduce. When such average particle diameter is excessively large, it tends to be difficult to obtain an improving action and effect on the water sealability.

The average particle diameter of the inorganic filler (C2) is a value measured with a laser diffraction particle size distribution measurement device, and is calculated from a D50 value (cumulative 50% particle diameter) in the resultant volume-based cumulative distribution.

The content of the filler (C) is preferably from 1 part by weight to 30 parts by weight, particularly preferably from 2 parts by weight to 25 parts by weight, more preferably from 2.5 parts by weight to 20 parts by weight with respect to 100 parts by weight of the carboxylic acid-modified PVA resin (A). When such content is excessively small, the film tends to have higher blocking tendency. When such content is excessively large, the flexibility and toughness of the film tend to reduce.

When the organic filler (C1) and the inorganic filler (C2) are used in combination, the content ratio (weight ratio: C1/C2) of the organic filler (C1) to the inorganic filler (C2) is preferably from 2 to 15, particularly preferably from 3 to 13, more preferably from 4 to 10. When the content ratio of the organic filler (C1) to the inorganic filler (C2) is excessively small, it tends to be difficult to obtain a satisfactory package owing to reductions in flexibility and toughness of the film. When the content ratio of the organic filler (C1) to the inorganic filler (C2) is excessively large, the water sealability tends to reduce.

The surfactant (D) to be used in the present disclosure is incorporated for the purpose of improving peelability from a cast surface at the time of the production of the water-soluble film. Typical examples thereof include a nonionic surfactant, a cationic surfactant, and an anionic surfactant. Specific examples thereof include polyoxyethylene nonyl phenyl ether, polyoxyethylene octyl nonyl ether, polyoxyethylene dodecyl phenyl ether, polyoxyethylene alkyl allyl ethers, polyoxyethylene sorbitan monolaurate, polyoxyethylene sorbitan monopalmitate, polyoxyethylene sorbitan monostearate, polyoxyethylene sorbitan monooleate, polyoxyalkylene alkyl ether phosphate monoethanolamine salts, and polyoxyethylene alkylamino ethers, such as polyoxyethylene laurylamino ether and polyoxyethylene stearylamino ether. Those surfactants may be used alone or in combination thereof. Of those, polyoxyalkylene alkyl ether phosphate monoethanolamine salts and polyoxyethylene laurylamino ether are suitable in terms of production stability.

The content of such surfactant (D) is preferably from 0.01 parts by weight to 3 parts by weight, particularly preferably from 0.1 parts by weight to 2.5 parts by weight, more preferably from 0.5 parts by weight to 2 parts by weight with respect to 100 parts by weight of the carboxylic acid-modified PVA resin (A). When such content is excessively small, peelability between the cast surface of a film-forming apparatus and the formed water-soluble film tends to reduce to cause a reduction in productivity of the film. When the content is excessively large, an inconvenience, such as a reduction in adhesive strength at the time of sealing to be performed in the case where the water-soluble film is formed into a package, tends to occur.

For example, another water-soluble polymer (e.g., sodium polyacrylate, polyethylene oxide, polyvinylpyrrolidone, dextrin, chitosan, chitin, methyl cellulose, or hydroxyethyl cellulose), a perfume, a rust inhibitor, a colorant, an extender, an antifoaming agent, a UV absorber, liquid paraffins, a fluorescent whitening agent, or a bitter component (e.g., denatonium benzoate) may be further incorporated to the extent that the object of the present disclosure is not inhibited. Those components may be used alone or in combination thereof.

In addition, in the present disclosure, an antioxidant is preferably blended in terms of the suppression of yellowing. Examples of such antioxidant include: sulfurous acid salts, such as sodium sulfite, potassium sulfite, calcium sulfite, and ammonium sulfite; tartaric acid; ascorbic acid; sodium thiosulfate; catechol; and Rongalite. Those antioxidants may be used alone or in combination thereof. Of those, sulfurous acid salts are preferred, and sodium sulfite is particularly preferred. The blending amount of such antioxidant is preferably from 0.1 parts by weight to 10 parts by weight, particularly preferably from 0.2 parts by weight to 5 parts by weight, more preferably from 0.3 parts by weight to 3 parts by weight with respect to 100 parts by weight of the carboxylic acid-modified PVA resin (A).

<Production of PVA Water-Soluble Film>

The PVA water-soluble film of the present disclosure may be produced by preparing a PVA resin aqueous solution (film-forming raw material) containing the carboxylic acid-modified PVA resin (A), and forming the PVA resin aqueous solution into a film through casting and drying.

Specifically, the PVA water-soluble film is produced by: a dissolving step of dissolving or dispersing a PVA resin composition containing the carboxylic acid-modified PVA resin (A), preferably further containing the plasticizer (B), and as required, still further containing the filler (C), the surfactant (D), and the like in water to prepare a PVA resin aqueous solution (film-forming raw material); and a film-forming step of forming a PVA water-soluble film through use of the film-forming raw material obtained in the previous step, in the stated order.

The steps are specifically described below.

[Dissolving Step]

In the dissolving step, the PVA resin composition is dissolved or dispersed in water to prepare the PVA resin aqueous solution (film-forming raw material).

Normal-temperature dissolution, high-temperature dissolution, pressure dissolution, or the like is typically adopted as a dissolution method at the time of the dissolution of the PVA resin composition in water. Of those, high-temperature dissolution and pressure dissolution are preferred because each of the methods produces a small amount of undissolved matter and is hence excellent in productivity.

A dissolution temperature is typically from 80° C. to 100° C., preferably from 90° C. to 100° C. in the case of the high-temperature dissolution, and is typically from 80° C. to 130° C., preferably from 90° C. to 120° C. in the case of the pressure dissolution.

A dissolution time, which only needs to be appropriately adjusted in accordance with the dissolution temperature and a pressure at the time of the dissolution, is typically from 1 hour to 20 hours, preferably from 2 hours to 15 hours, particularly preferably from 3 hours to 10 hours. When the dissolution time is excessively short, the undissolved matter tends to remain, and when the dissolution time is excessively long, the productivity tends to reduce.

In addition, in the dissolving step, a stirring blade is, for example, a paddle, FULLZONE, MAXBLEND, TWIN-STAR, anchor, ribbon, or propeller stirring blade.

Further, after the dissolution, the resultant PVA resin aqueous solution is subjected to degassing treatment, and a method for such degassing is, for example, static degassing, vacuum degassing, or biaxial extrusion degassing. Of those, static degassing or biaxial extrusion degassing is preferred.

The static degassing is performed at a temperature of typically from 50° C. to 100° C., preferably from 70° C. to 95° C., and its degassing time is typically from 2 hours to 30 hours, preferably from 5 hours to 20 hours.

The solid content concentration of such film-forming raw material is preferably from 10 wt. % to 50 wt. %, particularly preferably from 15 wt. % to 40 wt. %, more preferably from 20 wt. % to 35 wt. %. When such concentration is excessively low, the productivity of the film tends to reduce, and when the concentration is excessively high, the viscosity of the film-forming raw material tends to be so high that the degassing of the film-forming raw material requires time or a die line occurs at the time of the formation of the film.

In the production of the water-soluble film of the present disclosure, when the pH of the film-forming raw material is adjusted to fall within an appropriate weak alkaline range at the time of preparation of the film-forming raw material in the dissolving step, the PVA water-soluble film of the present disclosure, which satisfies the specific lactonization rate of the carboxylic acid modifying group after the formation of the film, can be produced.

Specifically, the pH of the film-forming raw material is preferably from 7.5 to 10, particularly preferably from 7.6 to 9, more preferably from 7.7 to 8.5.

As an adjustment method for the pH of the film-forming raw material, there is given, for example, an adjustment method involving blending a pH adjusting agent, and examples of such method include: (I) a method involving blending an appropriate amount of an alkali metal salt that shows alkalinity when turned into an aqueous solution into the film-forming raw material; (II) a method involving blending an appropriate amount of sodium hydroxide into the film-forming raw material; and (III) a method involving blending an appropriate amount of a basic substance, such as an amine or ammonia, into the film-forming raw material. Of those, in terms of the cold water solubility of the film obtained through the film formation, the methods (I) and (II) are preferred. Further, in terms of ease of adjustment of the pH to fall within the target weak alkaline range, and in terms of suppression of a reduction in water solubility of the film in association with an increase in saponification degree of the PVA resin caused by the alkali addition, the adjustment by the method (I) is particularly preferred.

The alkali metal salt that shows alkalinity when turned into an aqueous solution usable in the method (I) is preferably a salt of an alkali metal and a weak acid.

Examples of the alkali metal include lithium, sodium, potassium, rubidium, cesium, and francium. Of those, sodium and potassium are preferred, and sodium is particularly preferred in terms of cold water solubility. Those alkali metals may be used alone or in combination thereof.

The weak acid is preferably an acid having an acid dissociation constant pKa of more than 3 in an aqueous solution at 25° C. Examples of the acid having an acid dissociation constant pKa of more than 3 in an aqueous solution at 25° C. include carboxylic acids, such as formic acid [3.55] and acetic acid [4.56], hydrogen carbonate [pK1=6.35], hydrogen phosphate [pK2=7.20], carbonic acid [pK2=10.33], and phosphoric acid [pK3=12.35].

The acid dissociation constant in the aqueous solution at 25° C. is shown in the brackets, which is a value cited from "Iwanami Rikagaku Jiten, the fourth edition, (1987)."

Of those, from the viewpoints of ease of adjustment of the pH to fall within the weak alkaline range and suppression of a reduction in water solubility in association with an increase in saponification degree, a weak acid having an acid dissociation constant pKa of more than 6 and less than 12 is preferred, a weak acid having an acid dissociation constant pKa of more than 8 and less than 11 is particularly preferred, and carbonic acid is more preferred.

When an alkali metal salt of an acid having an excessively low pKa is used, it tends to be difficult to adjust the pH of the film-forming raw material to fall within the target weak alkaline range. When an alkali metal salt of an acid having an excessively high pKa is used, the blending amount of the alkali metal salt is increased at the time of adjustment of the pH to fall within the target pH range, which may affect the mechanical strength and heat sealability of the film.

However, for example, a compound that functions as a reducing agent, such as a sulfurous acid salt, easily changes into a sulfuric acid salt (strong acid salt) at the time of blending into the film-forming raw material, and hence it is sometimes difficult to use such compound for the adjustment of the pH to fall within the weak alkaline range.

In addition, a carboxylic acid salt is sometimes strongly acidic, and hence it is sometimes difficult to use such compound for the adjustment of the pH to fall within the weak alkaline range.

Specific examples of the alkali metal salt that shows alkalinity when turned into an aqueous solution include sodium carbonate, potassium carbonate, sodium hydrogen carbonate, potassium hydrogen carbonate, sodium hydroxide, potassium hydroxide, sodium acetate, potassium methoxide, sodium methoxide, potassium ethoxide, sodium ethoxide, potassium isobutoxide, sodium butoxide, and potassium tert-butoxide. Of those, carbonic acid salts are preferably used, and sodium carbonate is particularly preferably used. Those alkali metal salts may be used alone or in combination thereof.

In addition, examples of the basic substance usable in the method (III) include: amine compounds, such as ethylamine, diethylamine, ethanolamine, and trimethylamine; amine surfactants, such as a polyoxyethylene dialkylamine, a dipolyoxyethylene alkylamine, a monopolyoxyethylene monoalkylamine, a dipolyoxyethylene amine, a trialkylamine, a tripolyoxyethylene amine, and a polyoxyethylene oleylamine; and ammonia water. Those basic substances may be used alone or in combination thereof.

Of those, amine surfactants are preferably used because satisfactory blocking resistance is also obtained, and a polyoxyethylene dialkylamine is particularly preferably used because the pH is easily adjusted to fall within the weak alkaline range.

The blending amount of the pH adjusting agent is preferably from 0.5 parts by weight to 8 parts by weight, particularly preferably from 1 part by weight to 7 parts by weight, more preferably from 2 parts by weight to 6 parts by weight with respect to 100 parts by weight of the carboxylic acid-modified PVA resin (A). When such blending amount is excessively large, the pH adjusting agent may bleed out on the surface of the film to be obtained to cause a reduction in sealing strength of the film. When such blending amount is excessively small, the water solubility of the film tends to reduce owing to an increase in lactonization rate.

As a blending method for the pH adjusting agent, there are given, for example: (1) a method involving dissolving or dispersing the PVA resin composition in water to prepare the film-forming raw material, and then blending the pH adjusting agent into the film-forming raw material; (2) a method involving simultaneously blending the PVA resin composition and the pH adjusting agent into water to dissolve or disperse the PVA resin composition and the pH adjusting agent therein, to thereby prepare the film-forming raw material; and (3) a method involving dissolving or dispersing the PVA resin composition having blended therein the pH adjusting agent in advance in water, to thereby prepare the film-forming raw material. Of those, the method (2) is preferred because a sufficient adjustment time is obtained.

[Film-Forming Step]

In the film-forming step, the film-forming raw material prepared in the dissolving step is formed into a film shape, and is subjected to drying treatment as required. Thus, a PVA water-soluble film having a water content of less than 15 wt. % is formed.

At the time of the film formation, a method such as a melt extrusion method or a casting method may be adopted. Of those, a casting method is preferred in terms of the accuracy of the thickness of the film.

When the casting method is performed, the PVA water-soluble film of the present disclosure may be produced by casting the film-forming raw material by, for example: (i) a method involving causing the film-forming raw material to pass through a gap through use of an applicator, a bar coater, or the like to cast the film-forming raw material on a cast surface, such as a metal surface; or (ii) a method involving ejecting the film-forming raw material from a slit of a T-shaped slit die or the like to cast the film-forming raw material on a cast surface, such as a metal surface of an endless belt or a drum roll, and then drying the raw material.

A production method for the PVA water-soluble film involving ejecting and casting the film-forming raw material from a T-shaped slit die on a casting die, such as a cast drum (drum-type roll) or an endless belt, and drying the raw material of the above-mentioned item (ii) is described below.

The temperature of the film-forming raw material in the film-forming raw material-ejecting portion of the T-shaped slit die or the like is preferably from 60° C. to 98° C., particularly preferably from 70° C. to 95° C. When such temperature is excessively low, the viscosity of the film-forming raw material tends to increase to reduce the productivity of the PVA water-soluble film, and when the temperature is excessively high, foaming or the like tends to occur in the raw material.

After the casting, the film-forming raw material is dried on the cast surface. The drying is typically performed by heating the cast surface, such as the metal surface of an endless belt or a drum roll. The surface temperature of the cast surface is preferably from 50° C. to 110° C., particularly preferably from 70° C. to 100° C. When such surface temperature is excessively low, the water content of the film increases owing to insufficient drying, and hence its blocking tends to be liable to occur. When the surface temperature is excessively high, the film-forming raw material tends to foam to lead to a film formation failure.

In addition, in the drying at the time of the film formation, for example, drying with a heat roll, drying in which hot air is blown against the film with a floating dryer, and drying with a far-infrared ray apparatus or an induction heating apparatus may be used in combination.

After the film-forming raw material has been dried so as to have a water content of 15 wt. % or less in the drying treatment, the PVA water-soluble film is obtained by being peeled from the cast surface (when drying with a heat roll is further performed after the peeling from the cast surface, by being peeled from the drying heat roll). The PVA water-soluble film peeled from the cast surface (or the drying heat roll) is conveyed while being cooled under an environment at from 10° C. to 35° C.

In terms of suppression of the curling of the film, it is also preferred to further perform heat treatment after the film-forming step.

The heat treatment may be generally performed with a heat roll. In addition to the foregoing, for example, heat treatment in which hot air is blown against the film with a floating dryer, or heat treatment with a far-infrared ray device or an induction heating device is also permitted. In the present disclosure, the heat treatment is preferably performed with a heat roll in terms of productivity. A plurality of heat rolls may be used.

Specifically, when the heat treatment is performed, the temperature at which the film is subjected to the heat treatment (the temperature of the heat treatment apparatus) is preferably from 50° C. to 120° C., particularly preferably from 60° C. to 115° C., more preferably from 70° C. to 110° C. When such temperature is excessively low, a curling-alleviating effect tends to be hardly obtained, and when the temperature is excessively high, the water solubility of the film tends to reduce, or the sealability (in particular, water sealability) thereof tends to reduce at the time of the forming of a package.

A heat treatment time, which only needs to be appropriately adjusted in accordance with the heat treatment temperature, is preferably from 0.01 seconds to 30 seconds, particularly preferably from 0.05 seconds to 25 seconds, more preferably from 0.1 seconds to 20 seconds. When the heat treatment time is excessively short, a curling-suppressing effect tends to be low, and when the heat treatment time is excessively long, the curling of the film is suppressed, but the water solubility of the film tends to reduce.

With regard to such heat treatment temperature and heat treatment time, the heat treatment is preferably performed at high temperature for a short time period from the viewpoints of the suppression of a reduction in water solubility of the film and an improvement in productivity thereof. The heat treatment is particularly preferably performed at from 90° C. to 120° C. for from 0.01 seconds to 5 seconds, and is more preferably performed at from 100° C. to 115° C. for from 0.05 seconds to 3 seconds.

During the heat treatment, out of the two surfaces of the film, a film surface side (hereinafter sometimes described as "a surface side") opposite to a film surface side (hereinafter sometimes described as "13 surface side") brought into contact with the cast surface (e.g., the metal surface of an endless belt or a drum roll) is preferably subjected to the heat treatment. In terms of suppression of the curling of the film, it is particularly preferred that the a surface of the film be brought into contact with a heat roll (heat treatment device portion) so that the film has similar thermal histories on front and back surfaces thereof.

In addition, the surface of the water-soluble film of the present disclosure may be plain, but in terms of the blocking resistance of the film, the slidability thereof at the time of its processing, the alleviation of adhesiveness between the films serving as products, and the appearance thereof, it is preferred that one surface or both surfaces of the water-soluble film be subjected to texturing processing for imparting, for example, an embossed pattern, a fine uneven pattern, or a special engraving design.

At the time of such texturing processing, a processing temperature is typically from 60° C. to 150° C., preferably from 80° C. to 140° C. A processing pressure is typically from 2 MPa to 8 MPa, preferably from 3 MPa to 7 MPa. A processing time is typically from 0.01 seconds to 5 seconds, preferably from 0.1 seconds to 3 seconds, though the processing time varies depending on the processing pressure and the film formation speed.

In addition, cooling treatment may be performed after the texturing processing treatment as required for preventing unintentional stretching of the film due to heat.

In the present disclosure, the production of the PVA water-soluble film is performed under an environment at a temperature of preferably from 10° C. to 35° C., particularly preferably from 15° C. to 30° C. The humidity of the environment is generally preferably 70% RH or less.

In this way, the PVA water-soluble film of the present disclosure can be produced.

[Other Steps]

When a PVA water-soluble film in an elongated shape is produced, a winding step, packaging, storage, transportation, or the like is performed as required after the film-forming step.

In the winding step, the PVA water-soluble film having been peeled from the cast surface or the like in the film-forming step is transported and wound around a core pipe (S1) to prepare a film roll.

Although the resultant film roll may be supplied as it is as a product, the film roll may be supplied as a film roll having a desired size by being preferably wound around a core pipe (S2) having a length commensurate with the width of the PVA water-soluble film having a desired size again.

The core pipe (S1) around which the PVA water-soluble film is wound is cylindrical, and a material therefor may be appropriately selected from a metal, a plastic, and the like. Of those, a metal is preferred in terms of the fastness and strength of the core pipe.

The inner diameter of the core pipe (S1) is preferably from 3 cm to 30 cm, particularly preferably from 10 cm to 20 cm.

The wall thickness of the core pipe (S1) is preferably from 1 mm to 30 mm, particularly preferably from 2 mm to 25 mm.

The length of the core pipe (S1) needs to be made longer than the width of the PVA water-soluble film, and the core pipe is preferably made to protrude from each of the end portions of the film roll by from 1 cm to 50 cm.

In addition, the core pipe (S2) is cylindrical, and a material therefor may be appropriately selected from paper, a metal, a plastic, and the like. Of those, paper is preferred in terms of a reduction in weight of the core pipe and the handling thereof.

The inner diameter of the core pipe (S2) is preferably from 3 cm to 30 cm, particularly preferably from 10 cm to 20 cm.

The wall thickness of the core pipe (S2) is preferably from 1 mm to 30 mm, particularly preferably from 3 mm to 25 mm.

The length of the core pipe (S2) only needs to be a length equal to or longer than the PVA water-soluble film width of a product, and is preferably equal to or longer than the width by up to 50 cm.

The PVA water-soluble film is slit into a desired width when wound around the core pipe (S2).

At the time of such slitting, the film is slit with a shear blade, a razor blade, or the like, but is preferably slit with the shear blade in terms of the smoothness of a slit section.

The thickness of the PVA water-soluble film, which is appropriately selected in accordance with its applications and the like, is preferably from 10 μm to 120 μm, particularly preferably from 15 μm to 110 μm, more preferably from 20 μm to 100 μm. When such thickness is excessively small, the mechanical strength of the film tends to reduce. When the thickness is excessively large, the rate at which the water-soluble film is dissolved in water tends to reduce, and the efficiency of film formation also tends to reduce.

The width of the PVA water-soluble film, which is appropriately selected in accordance with the applications and the like, is preferably from 300 mm to 5,000 mm, particularly preferably from 500 mm to 4,000 mm, more preferably from 600 mm to 3,000 mm. When such width is excessively small, the production efficiency of the film tends to reduce, and when the width is excessively large, it tends to be difficult to control the sagging or thickness of the film.

The length of the PVA water-soluble film, which is appropriately selected in accordance with the applications and the like, is preferably from 100 m to 20,000 m, particularly preferably from 500 m to 15,000 m, more preferably from 1,000 m to 10,000 m. When such length is excessively small, labor tends to be required in the switching of the film. When the length is excessively large, the appearance of the film tends to be poor owing to its tight winding, or the weight thereof tends to be excessively heavy.

In addition, the water content of the PVA water-soluble film of the present disclosure is preferably from 3 wt. % to 15 wt. % in terms of its mechanical strength and sealability, and is particularly preferably from 5 wt. % to 14 wt. %, more preferably from 6 wt. % to 13 wt. %. When such water content is excessively low, the film tends to be too hard. When the water content is excessively high, its blocking tends to be liable to occur. The adjustment of the water content to such value may be achieved by appropriately setting a drying condition and a humidification condition.

The water content is measured in conformity with JIS K 6726 3.4, and the value of the resultant volatile content is adopted as the water content.

The film roll obtained by winding the PVA water-soluble film of the present disclosure around the core pipe is preferably packaged with a packaging film formed of a resin having a water vapor barrier property. Such packaging film is not particularly limited, but a packaging film having a moisture permeability of 10 $g/m^2$/day (measured in conformity with JIS Z 0208) or less may be used. The packaging film is specifically, for example, a single-layer film made of a high-density polyethylene, a low-density polyethylene, a polypropylene, a polyester, a polyvinylidene chloride-coated polypropylene, a glass-deposited polyester, or the like, or a laminated film thereof, or a laminated film thereof with a split cloth, paper, or a nonwoven fabric. Examples of the former laminated film include: a laminated film of a glass-deposited polyester and a polyethylene; and a laminated film of a polyvinylidene chloride-coated polypropylene and a polyethylene.

Such film is preferably subjected to antistatic treatment in terms of the prevention of the inclusion of foreign matter, and an antistatic agent may be kneaded into the film or its surface may be coated with the agent. When the antistatic agent is kneaded into the film, the agent is used in an amount of from about 0.01 wt. % to about 5 wt. % with respect to the resin forming the film, and when the surface is coated with the agent, the agent is used in an amount of from about 0.01 $g/m^2$ to about 1 $g/m^2$.

For example, an alkyl diethanolamine, a polyoxyethylene alkylamine, a higher fatty acid alkanolamide, or a sorbitan fatty acid ester is used as the antistatic agent.

In addition, the film roll packaged with the packaging film formed of the resin having a water vapor barrier property is preferably further packaged with a packaging film formed of an aluminum material. Examples of such film include an aluminum foil, a laminated film of an aluminum foil and a moisture-resistant plastic film (e.g., a laminated film of an aluminum foil and a polyethylene film), a laminated film of an aluminum-deposited film and a moisture-resistant plastic film (e.g., a laminated film of an aluminum-deposited polyester film and a polyethylene film), and a laminated film of an alumina-deposited film and a moisture-resistant plastic film (e.g., a laminated film of an alumina-deposited polyester film and a polyethylene film). In particular, in the present disclosure, a laminated film of an aluminum foil and a polyolefin film, or a laminated film of an aluminum-deposited film and a polyolefin film is useful, and a laminated film having a structure of a stretched polypropylene film/a polyethylene film/an aluminum foil/a polyethylene film, a laminated film having a structure of a stretched polypropylene film/a low-density polyethylene film/an aluminum foil, or the like is particularly useful.

At the time of the packaging, it is preferred that the film roll be sequentially packaged with the packaging film formed of the resin having a water vapor barrier property serving as an inner side and the packaging film formed of the aluminum material serving as an outer side, and margins of the films in their width directions be pushed into the core pipe.

In order to prevent flaws in the end portions of the film roll and the adhesion of foreign matter, such as dust, thereto, protective pads having core pipe through-holes may be mounted on both end portions of the film roll directly or after packaging.

A practical shape of each of the protective pads is a disc-shaped sheet or film so as to conform to the film roll. A buffer function based on, for example, a foam, a fabric shape, or a nonwoven fabric shape is preferably imparted to each of the pads for making their protective effects significant. In addition, a desiccant may be separately incorporated into the film roll, or may be laminated on or mixed in each of the protective pads for protecting the film roll from humidity.

A preferred material for each of the protective pads is a plastic, and specific examples thereof include a polystyrene, a polyethylene, a polypropylene, a polyester, and a polyvinyl chloride.

In addition, examples of the protective pad containing the desiccant include: a moisture-absorbing layer obtained by dispersing or impregnating a desiccant or a water-absorbing agent, such as calcium chloride, silica gel, a molecular sieve, a saccharide, in particular, a saccharide having a high osmotic pressure, or a water-absorbing resin, in a formable material, such as a natural cellulose, a synthetic cellulose, a glass cloth, or a nonwoven fabric, or applying the desiccant or the water-absorbing agent to the material, and drying the material having dispersed or impregnated therein, or applied thereto the desiccant or the water-absorbing agent; and a product obtained by sandwiching such moisture-absorbing agent or water-absorbing agent between the formable materials or thermoplastic resin films, such as a polyester film, a polyethylene film, a polypropylene film, and a Teflon (trademark) film.

As examples of a commercially available sheet-shaped desiccant, there are given "I.D. SHEET" manufactured by ID Corporation, "ALLOSHEET" and "ZEOSHEET" manufactured by Shinagawa Chemical Industry Co., Ltd., and "HI-SHEET DRY" manufactured by Hi-Sheet Industries.

The film roll packaged with such means is preferably stored or transported under a so-called air-floating state without being in contact with the ground by being supported through the arrangement of brackets (support plates) at protruding portions at both ends of the core pipe or the mounting of the protruding portions at both ends on stands. When the width of the film is relatively small, the brackets are used, and when the width of the film is relatively large, the stands are used.

Each of the brackets is formed of plywood or a plastic plate, and its size is generally such that the four sides of the bracket are larger than the diameter of the film roll.

Then, a pair of the brackets is arranged on the film roll as follows: the brackets are vertically placed at the core pipe-protruding portions at both ends of the film roll so as to face each other, and are fitted thereinto. The fitting is generally performed by arranging a bored hole somewhat larger than the diameter of the core pipe in the central portion of each of the brackets or boring a range from the upper portion of each of the brackets to the central portion thereof in a U-shaped manner so that the core pipe is easily inserted.

The film roll supported with the brackets is stored or transported after having been accommodated in a carton, such as a cardboard box. However, in order that the operation at the time of the accommodation may be smoothly performed, when rectangular brackets are used, the four corners of each of the brackets are preferably cut off.

In addition, it is preferred to fix both the brackets with a binding tape so that the pair of brackets does not wobble, and at the time, it is practical to arrange a tape shift-preventing groove comparable in size to the width of the tape on a side surface (thickness portion) of each of the brackets so that the movement or sagging of the tape does not occur.

At the time of the storage or transportation of the packaged film roll, an extremely high temperature condition, an extremely low temperature condition, an extremely low humidity condition, and an extremely high humidity condition are desirably avoided. Specifically, a temperature of from 10° C. to 30° C. and a humidity of from 40% RH to 75% RH are preferred.

The PVA water-soluble film of the present disclosure thus obtained is excellent in cold water solubility and has satisfactory mechanical properties, and hence is useful in individual packaging applications for a chemical agent and the like.

Specifically, after the PVA water-soluble film is immersed in a liquid detergent having a pH of 8, the PVA water-soluble film preferably has a dissolution time of 250 seconds or less in a water solubility test in water at 10° C. in terms of achievement of an improving effect on cold water solubility that cannot be achieved by the related art. The dissolution time is more preferably 200 seconds or less, particularly preferably 180 seconds or less, still more preferably 150 seconds or less.

In the present disclosure, the "dissolution time in a water solubility test in water at 10° C. after the film is immersed in a liquid detergent having a pH of 8" refers to a time obtained as described below. That is, the PVA water-soluble film having been conditioned at 23° C. and a humidity of 50% RH for 1 day is cut into a size measuring 100 mm by 100 mm, and immersed in a liquid detergent for clothes having a pH of 8 at 50° C. for 2 weeks. After that, the liquid detergent is wiped off, and the PVA water-soluble film is cut into a size measuring 3 cm by 5 cm and fixed on a jig. Next, 1 L of water is put in a 1 L beaker, and while the water is stirred with a stirrer (stirring bar length: 3 cm, rotation speed: from 200 rpm to 300 rpm) and kept at a temperature of 10° C., the film fixed on the jig is immersed in the water. The dissolution time refers to a time (second) for the film to be dissolved therein.

Herein, as a measure of "being dissolved", the film is regarded as being dissolved when dispersion of insoluble fine particles each having a diameter of 1 mm or more is not observed.

When the film has a thickness of 76 μm, the dissolution time obtained in the above-mentioned solubility test may be used as it is. When the film has a thickness other than 76 μm, the dissolution time is determined by the following conversion equation.

$$\text{Dissolution time (second) converted into a thickness of 76 μm} = (76 \text{ (μm)}/\text{thickness (μm) of film})^2 \times (\text{dissolution time (second) at the thickness of the film}) \quad [\text{Eq.}]$$

<Chemical Agent Package>

A chemical agent package of the present disclosure is a package obtained by packaging a chemical agent with the PVA water-soluble film of the present disclosure. The chemical agent is packaged with the PVA water-soluble film. Accordingly, after the package has been loaded in its entirety into water and the PVA water-soluble film has been dissolved, the chemical agent is dissolved or dispersed in the water to express its effect. Accordingly, the chemical agent package is suitable for a chemical agent package having packaged therein a relatively small amount of a chemical agent corresponding to, for example, a single use.

Examples of the chemical agent to be packaged with the film include: an agricultural chemical, such as a pesticide, a sterilizing agent, or a herbicide; a fertilizer; and a detergent. Of those, a detergent is particularly preferred.

The form of the chemical agent may be a liquid or a solid. In the case of the liquid, the chemical agent is a liquid chemical agent, and in the case of the solid, the chemical agent is, for example, a granular, tablet-like, or powdery chemical agent. The chemical agent is preferably a chemical agent to be used by being dissolved or dispersed in water. In the present disclosure, a liquid detergent is particularly preferably packaged with the film.

In addition, the pH of the chemical agent may fall within any of the alkaline, neutral, and acidic regions.

The surface of the chemical agent package is typically, for example, smooth. However, the outer surface of a package bag (the PVA water-soluble film) may be subjected to texturing processing for imparting, for example, an embossed pattern, a fine uneven pattern, or a special engraving design in terms of the blocking resistance of the chemical agent package, the slidability thereof at the time of its processing, the alleviation of adhesiveness between the products (packages), and the appearance thereof.

A liquid detergent package serving as an example of the chemical agent package of the present disclosure is described below.

The liquid detergent package holds such a shape as to package a liquid detergent therein at the time of its storage. In addition, at the time of the use of the package (at the time of laundry), the package bag (water-soluble film) is brought into contact with water. Accordingly, the package bag is dissolved, and hence the liquid detergent packaged therein flows out of the package bag.

With regard to the size of the liquid detergent package, its length is typically from 10 mm to 50 mm, preferably from 20 mm to 40 mm.

In addition, the film thickness of the package bag formed of the PVA water-soluble film is typically from 10 μm to 120 μm, preferably from 15 μm to 110 μm, particularly preferably from 20 μm to 100 μm.

The amount of the liquid detergent to be packaged in the package bag is typically from 5 mL to 50 mL, preferably from 10 mL to 40 mL.

When the chemical agent package is provided by packaging the liquid detergent with the PVA water-soluble film of the present disclosure, a known method may be adopted.

The chemical agent package is produced by, for example, bonding two PVA water-soluble films to each other. One film (bottom film) is fixed onto a die present in the lower portion of a forming apparatus, and the other film (top film) is also fixed to the upper portion of the apparatus. The bottom film is heated with a dryer, and is subjected to vacuum forming into the shape of the die. After that, the liquid detergent is loaded into the formed film, and then the top film and the bottom film are pressure bonded to each other. After the pressure bonding, a vacuum is released. Thus, the package may be obtained.

Examples of a method of pressure bonding the films to each other include (1) a heat sealing method, (2) a water sealing method, and (3) an adhesive sealing method. Of those, (2) a water sealing method is preferred because the method is versatile and excellent in productivity.

The liquid detergent is not particularly limited, and may be any of alkaline, neutral, and acidic liquid detergents. However, in terms of the water solubility of the film, the liquid detergent has a pH value of preferably from 6 to 14, particularly preferably from 7 to 11 when dissolved or dispersed in water. The pH value is measured in conformity with JIS K 3362 8.3. In addition, the water content of the liquid detergent is measured in conformity with JIS K 336 7.21.3.

In addition, the water content of the liquid detergent is preferably 15 wt. % or less, particularly preferably from 0.1 wt. % to 10 wt. %, more preferably from 0.1 wt. % to 7 wt. %. With this, the water-soluble film is prevented from being gelled or insolubilized, and its water solubility becomes excellent.

The viscosity of the liquid chemical agent is not particularly limited as long as the liquid chemical agent is a chemical agent in a liquid form that has fluidity and changes its form so as to fit a container, but is preferably from 10 mPa·s to 200 mPa·s. Such viscosity of the liquid chemical agent is measured with a B-type rotational viscometer at normal temperature (20° C.)

EXAMPLES

Now, the present disclosure is more specifically described by way of Examples. The present disclosure is not limited to Examples below without departing from the gist of the present disclosure.

The terms "part(s)" and "%" in the examples are on a weight basis.

The following carboxylic acid-modified PVA resins were prepared as the carboxylic acid-modified PVA resin (A).
(A1): Acrylic Acid-Modified PVA Resin 4% aqueous solution viscosity at 20° C.: 23.5 mPa·s, average saponification degree: 97 mol %, modification amount with acrylic acid: 7.6 mol %
(A2): Maleic Acid-Modified PVA Resin 4% aqueous solution viscosity at 20° C.: 22 mPa·s, average saponification degree: 96 mol %, modification amount with maleic acid monomethyl ester: 4.0 mol %

The following plasticizers were prepared as the plasticizer (B).
(B1): sorbitol (melting point: 95° C.)
(B2): glycerin (melting point: 18° C.)
(B3): trimethylolpropane (melting point: 58° C.)

The following fillers were prepared as the filler (C).
(C1): starch (average particle diameter: 20 μm)
(C2): silica (average particle diameter: 8 μm)

The following surfactant was prepared as the surfactant (D).
(D1): polyoxyalkylene alkyl ether phosphate monoethanolamine salt Example 1

100 Parts of the acrylic acid-modified PVA resin (A1) serving as the carboxylic acid-modified PVA resin (A), 13.5 parts of sorbitol (B1), 24 parts of glycerin (B2), and 5 parts of trimethylolpropane (B3) serving as the plasticizer (B), 4 parts of silica (C2) serving as the filler (C), 1.4 parts of the polyoxyalkylene alkyl ether phosphate monoethanolamine salt (D1) serving as the surfactant (D), 4.4 parts of sodium hydroxide serving as the pH adjusting agent, and water were mixed with each other and subjected to dissolution treatment while being stirred at 90° C. for 5 hours. Thus, a PVA resin aqueous solution (solid content concentration: 22%, pH: 8.9) serving as a film-forming raw material was obtained.

The obtained PVA resin aqueous solution was cast on a polyethylene terephthalate (PET) film, and caused to pass through a drying chamber at 105° C. to be dried. Thus, a PVA water-soluble film having a thickness of 80 μm was obtained.

Examples 2 and 3

A PVA water-soluble film was obtained by preparing a PVA resin aqueous solution in the same manner as in Example 1 except that sodium carbonate anhydride was used as the pH adjusting agent instead of sodium hydroxide, and the pH of the film-forming raw material was adjusted as shown in Table 1 below.

Example 4

100 Parts of the maleic acid-modified PVA resin (A2) serving as the carboxylic acid-modified PVA resin (A), 20 parts of sorbitol (B1) and 20 parts of glycerin (B2) serving as the plasticizer (B), 8 parts of starch (C1) serving as the filler (C), 1.4 parts of the polyoxyalkylene alkyl ether phosphate monoethanolamine salt (D1) serving as the surfactant (D), 4.4 parts of sodium carbonate anhydride serving as the pH adjusting agent, and water were mixed with each other and subjected to dissolution treatment while being stirred at 90° C. for 5 hours. Thus, a PVA resin aqueous solution (solid content concentration: 22%, pH: 7.7) serving as a film-forming raw material was obtained. A PVA water-soluble film was obtained in the same manner as in Example 1 except for the foregoing.

Comparative Example 1

A PVA water-soluble film was obtained by preparing a PVA resin aqueous solution in the same manner as in Example 1 except that the pH adjusting agent was not blended.

[Lactonization Rate of Carboxylic Acid Modifying Group]

The lactonization rate of a carboxylic acid modifying group in the carboxylic acid-modified PVA resin (A) in each of the PVA water-soluble films obtained in Examples 1 to 4 and Comparative Example 1 was measured in accordance with the above-mentioned method. The results are shown in Table 1.

[Water Solubility]

The PVA water-soluble films obtained in Examples 1 to 4 and Comparative Example 1 were each measured and evaluated for water solubility at 20° C. and 10° C. as described below.

The obtained PVA water-soluble film was cut into a size measuring 3 cm by 5 cm, and fixed on a jig. Next, water (1 L) was put in a 1 L beaker, and while the water was stirred with a stirrer (stirring bar length: 3 cm, rotation speed: from 200 rpm to 300 rpm) and kept at a temperature of 10° C. or 20° C., the film fixed on the jig was immersed in the water, and a time (second) for the film to be dissolved therein was measured.

As a measure of "being dissolved", the film was regarded as being dissolved when dispersion of insoluble fine particles each having a diameter of 1 mm or more was not observed. The results are shown in Table 1.

[Water Solubility Over Time]

The PVA water-soluble films obtained in Examples 1 to 4 and Comparative Example 1 were each evaluated for water solubility over time after immersion in a detergent as described below.

The PVA water-soluble film having been conditioned at 23° C. and a humidity of 50% RH for 1 day was cut into three sheets each having a size measuring 100 mm by 100 mm, and the three sheets were spread wide and put in separate zippered polyethylene bags (120 mm in width by 170 mm in height). After that, about 4 mL of liquid detergents for clothes having different pHs (pH 8 and pH 10.2) were separately put in the zippered polyethylene bags to immerse the films. Each of the zippered polyethylene bags in which the film and the liquid detergent were included was put in an aluminum bag (300 mm by 200 mm), and left to stand still at 50° C. for 2 weeks. After that, the film was taken from the zippered polyethylene bag, the liquid detergent was wiped out therefrom, and the film was subjected to a water solubility test at 10° C. in the same manner as in the measurement of the water solubility described above. The results are shown in Table 1.

[Mechanical Properties: 8% Elasticity Modulus]

The PVA water-soluble films obtained in Examples 1 to 4 and Comparative Example 1 were each measured for tensile properties in conformity with JIS K 7127 (1999). Specifically, the PVA water-soluble film was left to stand still at 23° C. under a humidification condition of 50% RH for 24 hours before measurement, and under this environment, was subjected to measurement at a tensile speed of 200 mm/min with Autograph AGS-H manufactured by Shimadzu Corporation (using analysis software Factory SHiKiBU2000 manufactured by Shimadzu Corporation) (film width: 15 mm, chuck-to-chuck distance: 50 mm).

The 8% elasticity modulus was calculated from the measurement results of the tensile properties based on the following equation. The results are shown in Table 1.

$$8\% \text{ Elasticity modulus (MPa)} = \text{stress (MPa) at strain of } 8\%/0.08 \qquad [\text{Eq.}]$$

TABLE 1

| | PVA water-soluble film | | | | | | | | |
|---|---|---|---|---|---|---|---|---|---|
| | | | | | Water solubility | | | | |
| | Carboxylic acid-modified PVA resin (A) | pH adjusting agent | pH of film-forming raw material | Lactonization rate (%) of carboxylic acid modifying group | Dissolution time (seconds) | | (Water solubility over time) Dissolution time (seconds, 10° C.) after immersion in detergent | | Mechanical properties 8% Elasticity modulus (MPa) |
| | | | | | 20° C. | 10° C. | pH 8 | pH 10.2 | |
| Example 1 | A1 | NaOH | 8.9 | 23 | 32 | 42 | 70 | 31 | 11 |
| Example 2 | A1 | Na$_2$CO$_3$ | 8.0 | 60 | 34 | 60 | 117 | 79 | 24 |
| Example 3 | A1 | Na$_2$CO$_3$ | 7.7 | 63 | 40 | 63 | 133 | 67 | 24 |
| Example 4 | A2 | Na$_2$CO$_3$ | 7.7 | 37 | 35 | 45 | 98 | 95 | 26 |
| Comparative Example 1 | A1 | — | 7.0 | 82 | 37 | 72 | 300 | 300 | 19 |

*The dissolution time is a value converted into a thickness of 76 μm.

As apparent from the results shown in Table 1 above, each of the PVA water-soluble films of Examples 1 to 4, which satisfies the specific lactonization rate of the carboxylic acid modifying group specified in the present disclosure, is excellent in water solubility at normal temperature (20° C.) and also excellent in cold water solubility (10° C.), and hence it is found that, when a chemical agent package is formed through use of the PVA water-soluble film, a satisfactory package is obtained.

At the same time, each of the PVA water-soluble films also has a value for the 8% elasticity modulus falling within a sufficiently practicable range, and hence it is found that the PVA water-soluble film satisfies mechanical properties when turned into a package.

Further, each of the PVA water-soluble films is also excellent in cold water solubility after immersion in the detergent, and hence it is found that, when the lactonization rate of the carboxylic acid modifying group falls within the specific range, a reduction in water solubility over time does not occur. Particularly when the lactonization rate falls within the specific range in the modified PVA resin in which the carboxylic acid modifying group is an acrylic acid modifying group, a reduction in water solubility after immersion in the detergent is remarkably alleviated, and it is found that a reduction in water solubility over time does not occur even when a neutral or weak alkaline chemical agent is packaged therein.

Each of the PVA water-soluble films of Examples 2 to 4 exhibits a high value for the 8% elasticity modulus, and hence it is found that the PVA water-soluble film is advantageous in the case where environmental changes are liable to occur, or in the case where there is a demand for higher functionality in terms of mechanical properties, such that the tense state of the film can be kept in a chemical agent package for a long period of time.

In contrast, the PVA water-soluble film of Comparative Example 1, which does not satisfy the specific lactonization rate of the carboxylic acid modifying group specified in the present disclosure, has a long dissolution time in cold water, and hence it is found that the PVA water-soluble film of Comparative Example 1 is inferior in cold water solubility.

Specific modes in the present disclosure have been described in Examples described above, but Examples described above are merely illustrative and should not be construed as being limitative. Various modifications apparent to a person skilled in the art are meant to fall within the scope of the present disclosure.

The water-soluble film of the present disclosure is excellent in cold water solubility and also excellent in mechanical properties, and hence a satisfactory package can be obtained. Therefore, the water-soluble film of the present disclosure can be used in packaging applications for various chemical agents, and in particular, is useful in an individual packaging application for a liquid detergent.

The invention claimed is:

1. A chemical agent package, comprising:
a package bag comprising a water-soluble film; and
a chemical agent packaged in the package bag;
wherein the water-soluble film is a polyvinyl alcohol water-soluble film comprising a carboxylic acid-modified polyvinyl alcohol resin (A) as a main component,
wherein the carboxylic acid-modified polyvinyl alcohol resin (A) is a maleic acid-modified polyvinyl alcohol resin,
wherein a lactonization rate of a carboxylic acid modifying group in the carboxylic acid-modified polyvinyl alcohol resin (A) calculated based on an integral value of a peak in a $^1$H-NMR spectrum by the following equation is from 20% to 70%:

Lactonization rate (%)=(II)/{(I)+(II)}×100 wherein, in the equation, a content of carboxylic acid or carboxylic acid salt is calculated based on an integral value (I) of a peak detected at 2.35 ppm to 2.9 ppm, and a content of a lactone ring structure is calculated based on an integral value (II) of a peak detected at 2.9 ppm to 3.35 ppm,
wherein the polyvinyl alcohol water-soluble film further comprises a plasticizer (B),
wherein the plasticizer (B) comprises a polyhydric alcohol (B1) having a melting point of 80° C. or more; and a polyhydric alcohol (B2) having a melting point of 50° C. or less,
wherein the water-soluble film has a dissolution time of 250 seconds or less in a water solubility test in water at 10° C. after the water-soluble film is immersed in a liquid detergent having a pH of 8, and
wherein the chemical agent has a pH of from 7 to 11.

2. The chemical agent package according to claim 1, wherein a carboxylic acid modification amount of the carboxylic acid-modified polyvinyl alcohol resin (A) is from 1 mol % to 20 mol %.

3. The chemical agent package according to claim 1,
wherein a content of the plasticizer (B) is from 20 parts by weight to 70 parts by weight with respect to 100 parts by weight of the carboxylic acid-modified polyvinyl alcohol resin (A).

4. The chemical agent package according to claim 1, wherein the lactone ring is at least one selected from the group consisting of α-acetolactone, β-propiolactone, γ-butyrolactone, and δ-valerolactone.

5. A chemical agent package, comprising:
a package bag comprising a water-soluble film; and
a chemical agent packaged in the package bag;
wherein the water-soluble film is a polyvinyl alcohol water-soluble film comprising a carboxylic acid-modified polyvinyl alcohol resin (A) as a main component; and further comprising a plasticizer (B),
wherein the carboxylic acid-modified polyvinyl alcohol resin (A) is a maleic acid-modified polyvinyl alcohol resin,
wherein a lactonization rate of a carboxylic acid modifying group in the carboxylic acid-modified polyvinyl alcohol resin (A) calculated based on an integral value of a peak in a $^1$H-NMR spectrum by the following equation is from 20% to 65%:

Lactonization rate (%)=(II)/{(I)+(II)}×100 wherein, in the equation, a content of carboxylic acid or carboxylic acid salt is calculated based on an integral value (I) of a peak detected at 2.35 ppm to 2.9 ppm, and a content of a lactone ring structure is calculated based on an integral value (II) of a peak detected at 2.9 ppm to 3.35 ppm,
wherein the plasticizer (B) comprises a polyhydric alcohol (B1) having a melting point of 80° C. or more; and a polyhydric alcohol (B2) having a melting point of 50° C. or less,
wherein the water-soluble film has a dissolution time of 250 seconds or less in a water solubility test in water at 10° C. after the water-soluble film is immersed in a liquid detergent having a pH of 8, and
wherein the chemical agent has a pH of from 7 to 11.

6. The chemical agent package according to claim 5, wherein the lactone ring is at least one selected from the group consisting of α-acetolactone, β-propiolactone, γ-butyrolactone, and δ-valerolactone.

7. The chemical agent package according to claim 5, wherein a carboxylic acid modification amount of the carboxylic acid-modified polyvinyl alcohol resin (A) is from 1 mol % to 20 mol %.

8. The chemical agent package according to claim 5,
wherein a content of the plasticizer (B) is from 20 parts by weight to 70 parts by weight with respect to 100 parts by weight of the carboxylic acid-modified polyvinyl alcohol resin (A).

\* \* \* \* \*